A. B. BROWNE.
COMBINED BREAST DRILL AND VALVE GRINDER.
APPLICATION FILED OCT. 20, 1911.
1,017,242.
Patented Feb. 13, 1912.
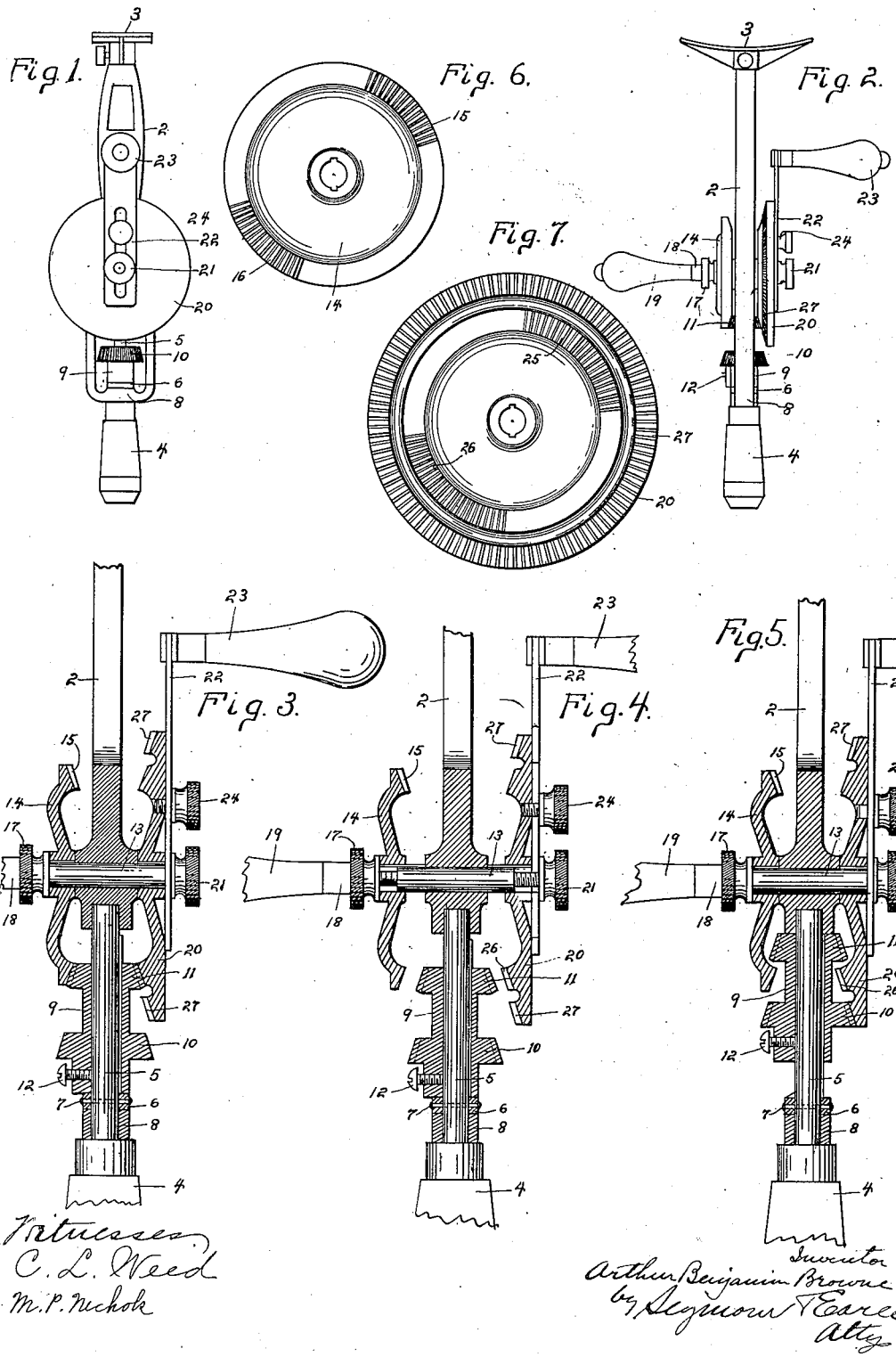

UNITED STATES PATENT OFFICE.

ARTHUR BENJAMIN BROWNE, OF BRANFORD, CONNECTICUT.

COMBINED BREAST-DRILL AND VALVE-GRINDER.

1,017,242.  Specification of Letters Patent.  Patented Feb. 13, 1912.

Application filed October 20, 1911. Serial No. 655,667.

*To all whom it may concern:*

Be it known that I, ARTHUR BENJAMIN BROWNE, a citizen of the United States, residing at Branford, in the county of New Haven and State of Connecticut, have invented a new and useful Improvement in Combined Breast-Drills and Valve-Grinders; and I do hereby declare the following, when taken in connection with the accompanying drawings and the letters of reference marked thereon, to be a full, clear, and exact description of the same, and which said drawings constitute part of this specification, and represent, in—

Figure 1 a side view of a combined breast drill and valve grinder constructed in accordance with my invention. Fig. 2 a similar view at right angles to Fig. 1. Fig. 3 a sectional view of a portion of the implement on an enlarged scale and showing the parts in position for producing an oscillating movement to the chuck. Fig. 4 a similar view showing the parts separated to permit the adjustment of the shaft. Fig. 5 a similar view with the parts in position to drive the chuck continuously in one direction. Fig. 6 a plan view of the smaller disk detached. Fig. 7 a face view of the driving disk detached.

This invention relates to a combined breast drill and valve grinder.

In the use of a breast drill the chuck must be driven in one direction, but in valve grinding it is desirable that the chuck shall be oscillated; that is, turned first in one direction and then the other. It is also desirable that the chuck shall be given a complete revolution.

The object of this invention is to provide in a single frame a breast drill and a device for grinding valves; and the invention consists in the construction hereinafter described and particularly recited in the claims.

In carrying out my invention, I employ a frame 2 including a breast plate 3 of substantially usual form. In the outer end of the frame a chuck 4 of any desired form is secured to the outer end of a shaft 5 which is seated in the frame and held in place by a collar 6 which is secured by a pin 7 to the shaft 5 at a point just above the outer end 8 of the frame. On this shaft above the collar 6 is a sleeve 9 formed with two bevel gears 10 and 11. The upper gear is smaller than the lower gear, and the sleeve 9 is adapted to be clamped to the shaft 5 by a set screw 12. Extending through the frame is a driving shaft 13, and keyed onto this shaft on one side of the frame is a rack disk 14 having two or more rack sections 15 and 16 adapted to mesh with the gear 11. This disk may be held in place by a nut 17 formed at the inner end of a spindle 18 on which a handle 19 is loosely mounted. On the opposite end of the driving shaft 13 is a drive gear disk 20. This disk is also keyed to the shaft 13 and is held in place by a nut 21 which nut also serves in part to hold the arm 22 of a driving handle 23. This arm 22 is slotted to permit adjustment and passage of the holding screw 24. On the inner face of this drive disk are segmental racks 25 and 26 corresponding in line with the racks 15 and 16 but arranged so as to stand between the racks 15 and 16, and the length of the segmental racks 25 and 26 is greater than the length of the segmental racks 15 and 16 for the purpose as will hereinafter appear. Around the circumference of the disk 20 is a continuous rack 27.

If the sleeve 9 is moved outward, as shown in Fig. 3, the bevel gear 11 will be in position to mesh with the sectional racks 15 and 16 on the disk 14, and the sectional racks 25 and 26 on the drive disk 20. If now the handle 23 be turned, the shaft will be rotated and the chuck turned first in one direction and then in the other, thus giving an oscillating motion to the tool carried by the chuck, and because the sectional racks on one disk are longer than the sectional racks on the other, it follows that the chuck will gradually make a complete revolution; that is, the chuck does not make a half turn in one direction and half a turn in the other and consequently balance; but if it makes half a turn in one direction, it will make more than half a turn in the opposite direction, and so gradually increases its motion in one direction until it has made a complete revolution. This gives the desired motion to the chuck in grinding valves. If now it is desired to use the device as a breast drill, the nuts 17 and 21 will be loosened to allow the disks 14 and 20 to be separated as shown in Fig. 4 of the drawings. The sleeve 9 will then be unlocked from the shaft 5 and slipped upward into position shown in Fig. 5, and so that the gear 11 clears the racks 15 and 16 and 25 and 26, and the gear 10 comes into mesh with the circular rack 27 on the drive disk 20. The disks are again interlocked and then when the drive disk 20 is turned it will turn the chuck continuously in one direction.

I claim:—

1. The combination with a frame, of a driven shaft mounted in said frame, a sleeve secured to said shaft, said sleeve carrying two bevel gears, a drive shaft, disks carried by said drive shaft upon opposite sides of said driven shaft, both of said disks carrying sectional racks adapted to be engaged with one of the bevel gears, and one of the disks carrying an endless rack adapted to be engaged by the other bevel gear.

2. The combination with a frame, a chuck mounted in said frame and having an inwardly projecting shaft, a sleeve longitudinally movable on said shaft, said sleeve carrying two bevel gears, a drive shaft, disks carried by said drive shaft, both of said disks having sectional racks adapted to be engaged by one of the bevel gears, and one of the disks formed with an endless rack adapted to be engaged by the other gear.

3. The combination with a frame, a chuck mounted in the said frame and having an inwardly projecting shaft, a sleeve adjustably secured to said shaft, said sleeve carrying two bevel gears, a drive shaft, disks adjustably secured to said drive shaft, both of said disks having sectional racks adapted to be engaged by one of the bevel gears, and one of the disks formed with an endless rack adapted to be engaged by the other gear.

4. The combination with a frame, a chuck mounted in said frame and having an inwardly projecting shaft, a sleeve adjustably secured to said shaft, said sleeve carrying two bevel gears, a drive shaft, disks carried by said drive shaft, one of said disks adapted to be moved longitudinally on the drive shaft, whereby the disks may be separated to permit the adjustment of the sleeve, both of said disks having sectional racks adapted to be engaged by one of the bevel gears, and one of the said disks formed with an endless rack adapted to be engaged by the other gear.

In testimony whereof, I have signed this specification in the presence of two subscribing witnesses.

ARTHUR BENJAMIN BROWNE.

Witnesses:
WALTER S. WOOD,
CLINTON S. JULIAN.